United States Patent
Cheng et al.

(10) Patent No.: US 7,162,394 B2
(45) Date of Patent: Jan. 9, 2007

(54) GENERIC EMBEDDED DEVICE AND MECHANISM THEREOF FOR VARIOUS INTELLIGENT-MAINTENANCE APPLICATIONS

(75) Inventors: Fan-Tien Cheng, Tainan (TW); Guo-Wei Huang, San Chung (TW); Chun-Hung Chen, Tainan (TW); Min-Hsiung Hung, Taoyuan Hsien (TW)

(73) Assignee: National Cheng Kung University, Tainan (TW)

( * ) Notice: Subject to any disclaimer, the term of this patent is extended or adjusted under 35 U.S.C. 154(b) by 177 days.

(21) Appl. No.: 10/846,768

(22) Filed: May 13, 2004

(65) Prior Publication Data

US 2005/0021277 A1    Jan. 27, 2005

(30) Foreign Application Priority Data

May 13, 2003    (TW) ............................... 92112998 A

(51) Int. Cl.
*G06F 13/12* (2006.01)

(52) U.S. Cl. ............... 702/184; 702/182; 702/186; 702/188

(58) Field of Classification Search ............... 702/122, 702/123, 155, 182–184, 188; 187/247; 370/467; 709/224
See application file for complete search history.

(56) References Cited

U.S. PATENT DOCUMENTS

| | | | |
|---|---|---|---|
| 5,559,794 A * | 9/1996 | Willis et al. ............ | 370/463 |
| 6,470,386 B1 * | 10/2002 | Combar et al. .......... | 709/224 |
| 6,556,659 B1 * | 4/2003 | Bowman-Amuah ........ | 379/9.04 |
| 2002/0099634 A1 * | 7/2002 | Coutts et al. ............. | 705/35 |
| 2004/0094366 A1 * | 5/2004 | Weinberger et al. ....... | 187/247 |

FOREIGN PATENT DOCUMENTS

| | | |
|---|---|---|
| JP | 11-053405 | 2/1999 |
| JP | 2002-211090 | 7/2002 |

* cited by examiner

*Primary Examiner*—Marc S. Hoff
*Assistant Examiner*—Felix Suarez
(74) *Attorney, Agent, or Firm*—Glenn Patent Group; Michael A. Glenn

(57) ABSTRACT

A generic embedded device (GED) and a mechanism for retrieving and transmitting information of various intelligent-maintenance (IM) applications are disclosed. The GED is an object-oriented and cross-platform device built in an embedded real-time operating system, and can be installed in various kinds of information equipment, and has a generic application interface for the future development of application modules. The present invention enables all kinds of information equipment to retrieve, collect, manage, and analyze equipment data for IM applications; and further to receive/transmit the IM-related equipment information wired or wireless from/to remote clients via communication agents through Internet/Intranet.

20 Claims, 5 Drawing Sheets

GENERIC EMBEDDED DEVICE AND MECHANISM THEREOF FOR VARIOUS INTELLIGENT-MAINTENANCE APPLICATIONS

FIELD OF THE INVENTION

The present invention relates to a generic embedded device (GED) and a mechanism thereof for various intelligent-maintenance (IM) applications, and more particularly, to the extensible GED and the mechanism thereof for retrieving and transmitting information of various IM applications.

BACKGROUND OF THE INVENTION

For a manufacturing factory, it is very important to collect and analyze process information efficiently. In general, the manufacturing factory adopts a system provided by an information vender or a special system developed by itself for collecting and analyzing the process information so as to perform various maintenance applications, such as status-monitoring, fault-detection, diagnostics, and prognostics of various kinds of information equipment. Either the system developed by the system vendor or the special system developed by the manufacturing factory lacks standard communication interfaces with respect to various kinds of equipment, different application modules and external systems. Thus, different kinds of programs for collecting and analyzing the process information have to be developed for various kinds of equipment, different maintenance application modules and external systems.

University of Wisconsin and University of Michigan in USA established an Industry/University Cooperative Research Center on Intelligence Maintenance Systems (IMS), wherein the concept of "Intelligent Maintenance" is presented, which considers that components and machines generally have four operation states: a normal operation state; a degradation state; a maintenance state; and a failure state. When aging phenomena occur, the components or machines generally first experience a series of deteriorating process and then the failure state follows. Hence, if the deteriorating status can be detected and sensed, then preventive maintenance can be made before the failure state occurs. However, the current equipment-information acquisition scheme proposed by the IMS center does not take data management and hardware variations into consideration, thus having poor migration capability of linking to different kinds of information equipment. The D2B (Device-to-Business) concept of IMS does not emphasis on expansibility for various maintenance application modules, thus increasing the difficulty level of adopting different maintenance application modules. Further, the IMS center does not propose any standard mechanism for retrieving and transmitting maintenance-related information.

Hence, there is an urgent need to develop a GED and a mechanism thereof for various IM applications, thereby efficiently connecting to various kinds of information equipment; using an open interface of object-oriented design for solving the expansibility problem of considering various maintenance application modules; and establishing a standard mechanism for information acquisition and transmission, so as to be generic in retrieving and transmitting information for various kinds of information equipment.

SUMMARY OF THE INVENTION

An object of the present invention is to provide a GED and a mechanism thereof for various IM applications, thereby enabling the information equipment having a wired or wireless linking interface to own the capability of retrieving and transmitting the information of various IM applications.

Another object of the present invention is to provide a GED and a mechanism thereof for various IM applications, thereby overcoming the shortcoming of the conventional data-retrieval program which is merely suitable for use in one single information equipment or specific hardware.

Another object of the present invention is to provide a GED and a mechanism thereof for various IM applications, wherein an open interface of object-oriented design is adopted to resolve the expansibility problem, thus allowing R&D personnel to add various maintenance application modules easily.

Another object of the present invention is to provide a GED and a mechanism thereof for various IM applications, wherein three standard processes for retrieving and transmitting information are established for being generically applied in manipulating the information of various kinds of information equipment.

According to the aforementioned objects, a GED for various IM applications is provided for retrieving, collecting, managing and analyzing information of information equipment.

According to a preferred embodiment of the present invention, the GED comprises a data collector and a communication manager. The data collector is used for collecting and managing the information of the information equipment, and further includes a device driver and a collection plan, wherein the device driver is used for retrieving the information of the information equipment, and is equipment-dependent, and the collection pan is responsible for managing the information retrieved by the device driver, and is equipment-independent. The communication manager further includes a communication agent, an application interface and a collection interface. The communication agent is used for transmitting the information of the information equipment to an external system, or receiving a command from the external system. The application interface is responsible for linking to an IM application module, and the IM application module can use the application interface to obtain the information transmitted by the data collector. The collection interface is particularly linked to the collection plan for transmitting the information of the information equipment to the communication agent or the application interface.

Further, according to the aforementioned objects, a mechanism of a GED for various IM applications is provided for retrieving, collecting, managing and analyzing information of information equipment.

According to a preferred embodiment of the present invention, the information acquisition and transmission mechanism comprises an exception notification process, a periodic inspection process, and a data inquiry process. In the exception notification process, the information equipment initiates an exception message when an exception occurs, and the exception message is delivered to an IM application module or an external system via the GED. The periodic inspection process is activated by a data-retrieval request sent by the IM application module. After the device driver of the GED has retrieved the information of the information equipment in accordance with the data-retrieval request, the information of the information equipment is sent to the IM application module. Then, the IM application module starts to analyze and evaluate the information. Thereafter, the inspection result is sent to the external system. The data inquiry process is activated by a data-inquiry request sent by the external system. After the GED has retrieved the information of the information equipment in accordance with the data-inquiry request, the information of the information equipment is replied to the external system via the communication agent of the GED.

Hence, the present invention can be generically applied for retrieving and transmitting information of various kinds of information equipment; has the expansibility of adopting various IM application modules; can be embedded to various kinds of information equipment or hardware; and can use standardized processes of information acquisition and transmission to retrieve and transmit the information of various kinds of information equipment.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The GED of the present invention includes two main portions: an operating environment built with an embedded real-time operating system (RTOS); and object-oriented and cross-platform system software. The present invention is to implement the system software in the RTOS with the form of integrated device, wherein the RTOS has a real-time scheduler (i.e. having real-time scheduling algorithms); TCP/IP stacks (i.e. having a complete TCP/IP network capability); a complete memory management, which also supports virtual memory, memory paging and a memory management unit (MMU); and a complete Java execution environment. The RTOS of the present invention also can be installed in the following storage devices: disk-on-modules of IDE/USB/PCI interface; disk-on-chips of IDE/USB/PCI interface; compact flash cards of IDE/USB/PCI interface; and other flash memories of IDE/USB/PCI interface.

The RTOS of the present invention is developed in accordance with embedded Linux technology, and yet WinCE, WinCE.net and XP Embedded operating systems are also applicable to the present invention. One of the best advantages for using the embedded Linux technology to develop an embedded device is to evolve the entire development pattern from the conventional method of integrating hardware with assembly language to the method of developing application software alone, thereby further providing software resolution tasks having stronger functions. Meanwhile, in the aspect of building the entire embedded Linux system, the present invention adopts the method of open source to develop the software, and uses a lot of free software as resolution tasks.

The GED of the present invention can be fabricated in the form of such as single board systems, personal computers without hard disk driver, and computer systems of ARM/MIPS/PowerPC, etc. Hereinafter, the system software of the GED of the present invention will be described.

Figure 1:
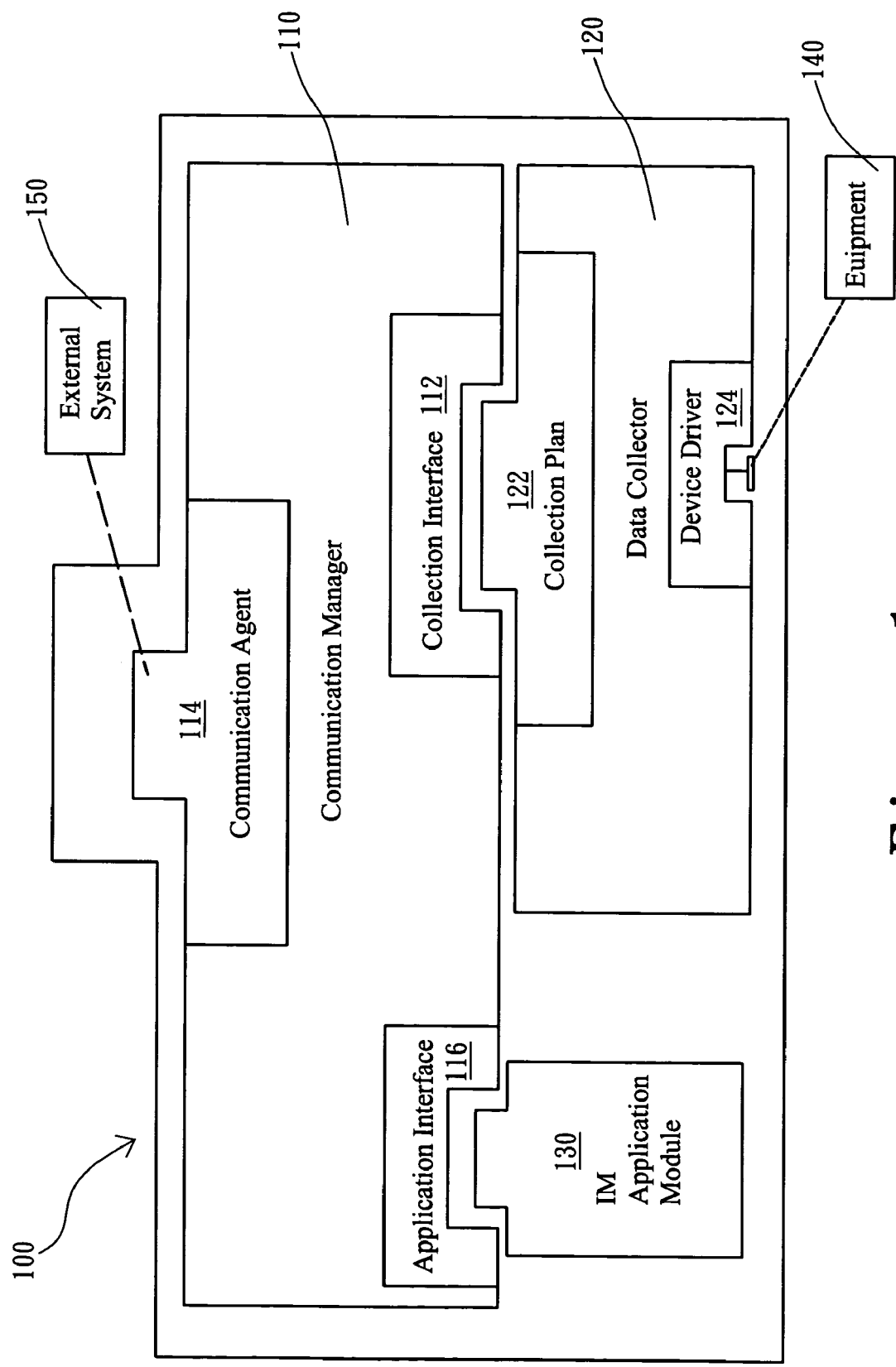
FIG. 1 is a schematic structural diagram of a GED according to the present invention.

Referring to FIG. 1, FIG. 1 is a schematic structural diagram of a GED according to the present invention. The GED 100 of the present invention comprises a data collector 120, a communication manager 110 and an IM application module 130, wherein the IM application module 130 is a pluggable customized application module having intelligent-maintenance functions. The data collector 120 is an element used for collecting and managing information, and is composed of a collection plan 122 and a device driver 124, wherein the collection plan 122 is responsible for managing the information that is retrieved by the device driver 124 from equipment 140, and the collection pan 122 is equipment-independent, i.e. the collection plan 122 can be used for any kind of information equipment. The device driver 124 is used for retrieving the information of the equipment 140, and is equipment-dependent, i.e. different kinds of information equipment have different designs of device drivers, wherein the device driver can be designed with reference to the interface specification provided by an equipment vendor (for example, a device driver for car usage, a device driver for semiconductor equipment usage). The data collection is handled by the device driver 124 that is installed in the data collector 120, and the device driver 124 is used for resolving the interface problem with the equipment 140 so as to obtain the information of the equipment 140. The collection plan 122 in the data collector 120 is responsible for managing the information retrieved by the device driver 124, so that the collection plan 122 does not need to worry about how to communicate with the equipment 140.

The scheme of the collection plan 122 for classifying and managing equipment information can be, for example, to classify the information based on the functions of the information equipment; to classify the information based on the data type, such as real, integer and Boolean types, etc.; to packet the equipment information as an object; to transform the information into metadata in XML format; or any other management scheme that can be implemented by a program language. The scheme of the device driver for obtaining the equipment information can be performed via for example, standard hardware I/O interfaces, such as RS-232, RS-485, etc.; standard TCP/IP-wired or TCP/IP-wireless network protocols, such as IEEE 802.11a, IEEE 802.11b, Bluetooth, etc.; interfaces defined by hardware; file transfers; industry-defined specifications, such as OPC (OLE for Process Control) servers, and SEMI SECS I (E4), SECS II (E5), GEM (E30), HSMS (E37), OBEM (E98), CEM (E120), etc. for semiconductor or electronic industries.

The communication manager 110 includes a communication agent 114, an application interface 116 and a collection interface 112. The collection interface 112 is used for particularly linking to the collection plan 122 of the data collector 120, and the collection interface 112 transmits the information of the equipment 140 to the IM application module 130 or an external system 150. The application interface 116 is a program interface responsible for linking to the IM application module 130, which is pluggable to the GED 100, and the IM application module 130 obtains the information transmitted by the collection interface 112 via the application interface 116. Hence, when the GED needs special functions (such as the application programs of status-monitoring, fault-detection, diagnostics, or prognostics, etc. required for the equipment 140), those special functions can be easily added to the GED 100 merely by coding the functions in the form of the IM application module 130 with reference to the specifications of the application interface 116 and the IM application module 130. The standard functional specification of the application interface 116 can be such as:

```
Class {
    receiveExceptionInfo( );
    submitRequest( );
    submitStatus( );
    requestforData( );
}.
```

The standard functional specification of the IM application module 130 can be such as:

```
Class {
    analyzeExceptionInfo( );
    analyzeData( )
}.
```

Further, the communication manager 110 relies on the communication agent 114 to send the analysis result to the external system 150, and the external system 150 also can send a command to the communication manager 110 via the communication agent 114, wherein the communication agent 114 can adopt SOAP (Simple Object Access Protocol) or Web Services specifications to transfer the information to another end of Intranet/Internet via wired or wireless communication. Besides, other communication specifications such as CORBA (Common Object Request Broker Architecture), DCOM (Distributed Component Object Model), or RMI (Remote Method Invocation) are also adoptable.

Such as shown in FIG. 1, the operation process for each component of the GED 100 is explained as follows:

The data collector 120 obtains the information of the equipment 140 via the device driver 124 installed therein. Thereafter, the collection plan filters and classifies the information acquired by the device driver 124, and then transmits the treated information to the communication manager 110 via the collection interface 112. If the IM application module 130 is plugged to the GED 100, the communication manager 110 will transmit all the required information to the IM application module 130 via the application interface 116. If there is any information needed sending to the external system 150, the communication manager 110 will transmit the information to the external system 150 wiredly or wirelessly via the communication agent 114. It is worthy to be noted that the GED 100 of the present invention is built in a bi-directional communication infrastructure, i.e. the external system 150 also can issue a command to the equipment 140 via the communication agent 114, the collection interface 112, the collection plan 122 and the device driver 124.

The present invention is a GED containing system software, and the GED can be directly installed inside information equipment, and the intelligent-maintenance-related information retrieved by the GED can be customized in accordance with actual requirements. Since the entire system software is designed with the object-oriented technology, the IM application module 130 for executing special applications can be added via the implementation by merely referring to the interface specification of the application interface 116 in the communication manager 110 and that of the IM application module 130. Hence, the information equipment adopting the present invention can have stronger capability of customizing various intelligent-maintenance applications via wired or wireless networking.

With respect to the information-retrieval method, the present invention adopts the scheme of first collecting and managing followed by transmitting. According to the present invention, there are three kinds of process the mechanisms of information acquisition and transmission of the GED for various IM applications: an exception notification process, a periodic inspection process, and a data inquiry process. In the exception notification process, the equipment 140 initiates an exception message actively when an exception occurs, and the exception message is delivered to the IM application module 130 or the external system 150 via the GED 100. In the periodic inspection process, a data-retrieval request or an inspection request are submitted periodically by the IM application module 130 plugged to the GED 100, and, after the GED 100 has retrieved the information of the equipment 140 in accordance with the data-retrieval or inspection request, the information of the equipment 140 is replied to the IM application module 130. Then, the IM application module 130 will run the analytical process. After the analyzed result is obtained, it will then be sent to the external system 150. In the data inquiry process, the external system 150 submits a data-inquiry request, and after the GED 100 has retrieved the information of the equipment 140 in accordance with the data-inquiry request, the information is replied to the external system 150 via the communication agent 114. Hereinafter, the detailed scenarios of those three processes will be discussed.

1. Exception Notification Process

Figure 2:
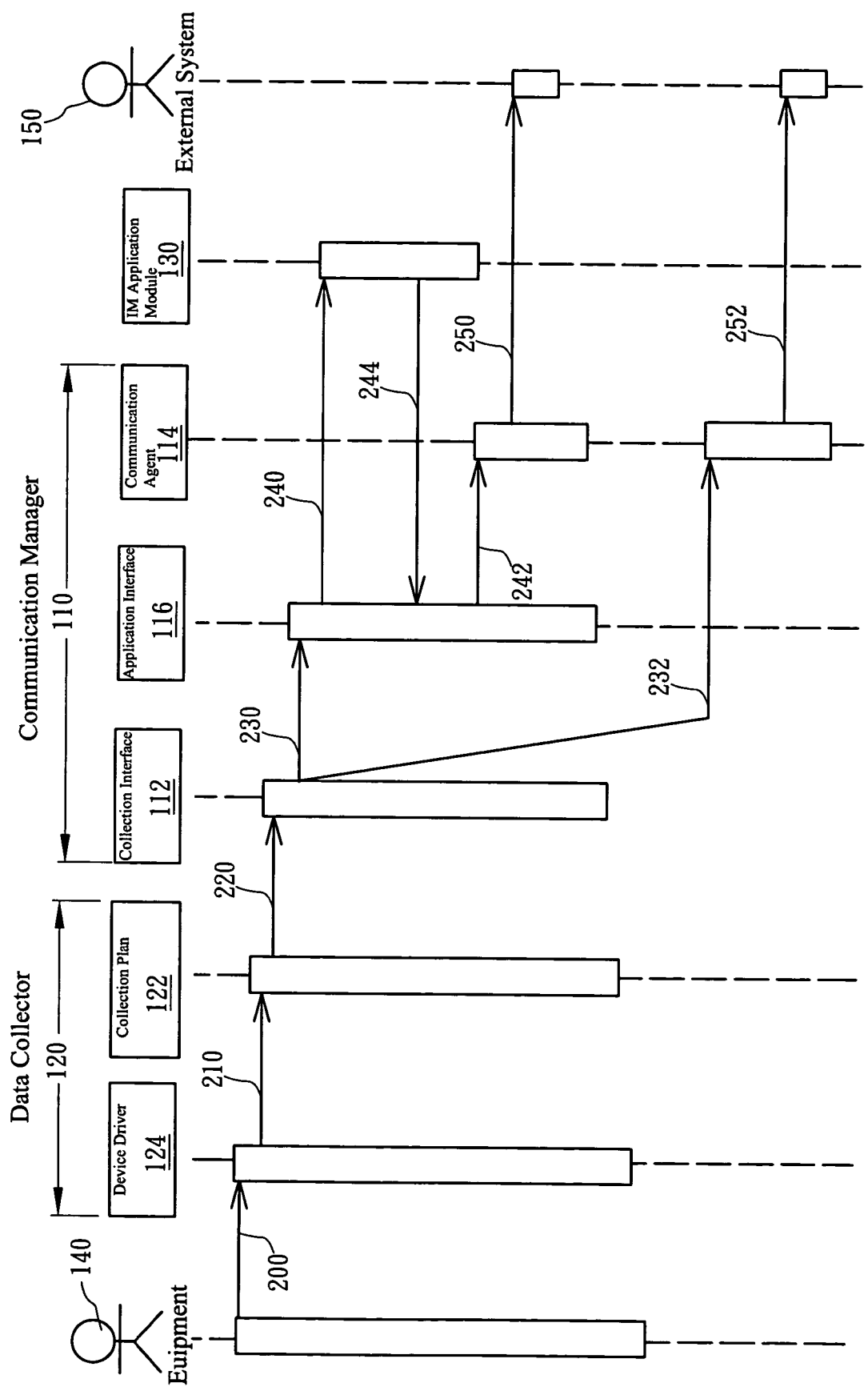
FIG. 2 is a schematic sequence diagram showing an exception notification process of the present invention.

Referring to FIG. 2, FIG. 2 is a schematic sequence diagram showing an exception notification process of the present invention. When an exception occurs to the equipment 140, the equipment 140 actively sends an exception message. The exception message is classified by the collection plan 122, and then the collection interface 112 may choose to deliver the exception message to the IM application module 130 for analysis and treatment. After the analysis and treatment is done, the IM application module 130 informs the external system 150 of the analyzed results. If the analysis by the IM application module 130 is dispensable, the collection interface 112 may choose to send the exception message directly to the external system 150. The IM application module 130 or the external system 150 may perform the job of status-monitoring, fault-detection, diagnostics, or prognostics onto the equipment 140. The message flow process is described as follows.

When an exception occurs to the equipment 140, the equipment will actively deliver an exception message (step 200). Then, in the data collector 120, the device driver 124 is linked to the physical hardware interface of the equipment 140 so as to obtain the exception message. Thereafter, the collection plan 122 classifies and filters the exception message (step 210) into exception information, and subsequently, two possible scenarios follows.

(1) Sending the Exception Information to the IM Application Module

The collection plan 122 sends the exception information to the collection interface 112 of the communication manager 110 (step 220). Then, the application interface 116 receives the exception information from the collection interface (step 230), and delivers the exception information to the IM application module 130 for analysis (step 240), and the IM application module 130 submits a status report to the application interface 116 (step 244). Thereafter, the application interface 116 sends the status report to the communication agent 114 (step 242), and the communication agent 114 sends the status report to the external system 150 (step 250).

(2) Sending the Exception Information to the External System

The collection plan 122 sends the exception information to the collection interface 112 (step 220). Then, the collection interface 112 sends the exception information to the communication agent 114 (step 232). Thereafter, the communication agent 114 sends the exception information to the external system 150 (step 252).

2. Periodic Inspection Process

Figure 3:
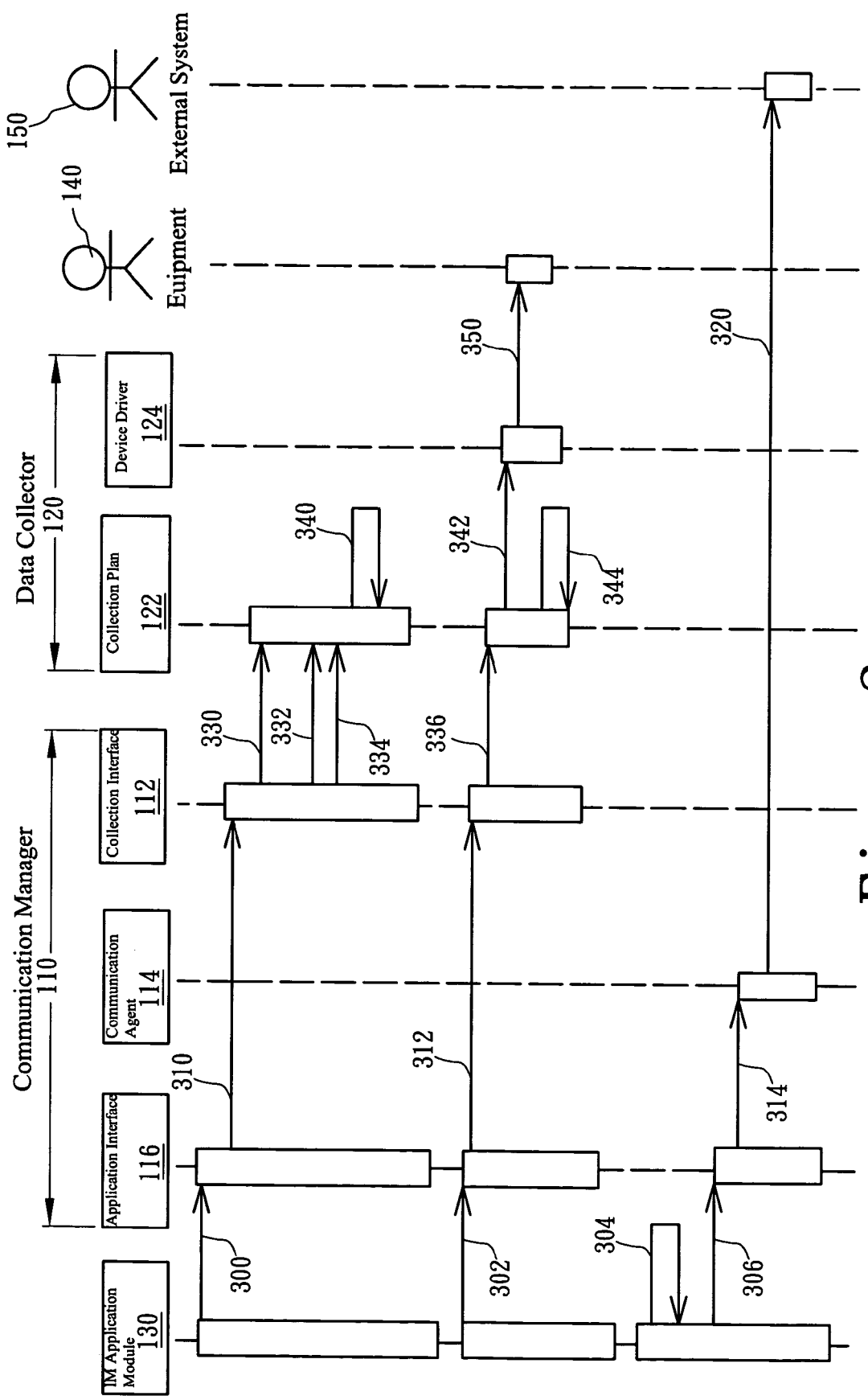
FIG. 3 is a schematic sequence diagram showing a periodic inspection process of the present invention.

Referring to FIG. 3, FIG. 3 is a schematic sequence diagram showing a periodic inspection process of the present invention. This process has three steps. The periodic inspection process is activated by a periodic-inspection request sent by the IM application module 130 plugged to the GED; if the request is granted, then the IM application module 130 can start retrieving information from the equipment 140; thereafter, the IM application module 130 performs the inspection program and sends the inspection result to the external system 150. Hereinafter, the detailed scenarios of those three steps will be discussed.

The IM application module 130 actively submits the request for a periodic inspection (step 300), and meanwhile, sends the request-related data for the periodic inspection. Via the application interface 116, the communication manager 110 receives the request-related data provided by the IM application module 130, and then passes the request-related data to the collection interface 112 (step 310), thus passing the request-related data to the data collector 120. Subsequently, the collection interface 112 requests the collection plan 122 to set data type (step 330), buffer size (step 332), and start time (step 334) in accordance with the request-related data sent by the communication manager 110. After these parameters are properly set, the collection plan 122 then generates a data collection plan (step 340).

After the data collection plan is generated, the IM application module 130 begins to send the request for data (step 302), and transmits the request for data via the application interface 116 (step 312). Then, the collection interface 112 requests the collection plan 120 to start a data collection plan (step 336). Thus, after receiving the request for starting the data collection plan, the collection plan 122 starts to collect equipment data via the device driver 124 (step 342). Thereafter, the device driver 124 is linked to the physical interface of the equipment 140 so as to obtain data (step 350). After the physical equipment data have been collected, the collection plan 122 starts to classify and filter these data (step 344), and sends the data classified and filtered to the IM application module 130 for further processing.

After getting the data of the equipment 140, the IM application module 130 starts to analyze and evaluate data (step 304), and a status report of inspection result is generated and sent to the application interface 116 (step 306). Thereafter, the application interface 116 sends the status report to the communication agent 114 (step 314), and then the communication agent 11 sends the status report to the external system 150 (step 320).

3. Data Inquiry Process

Figure 4:
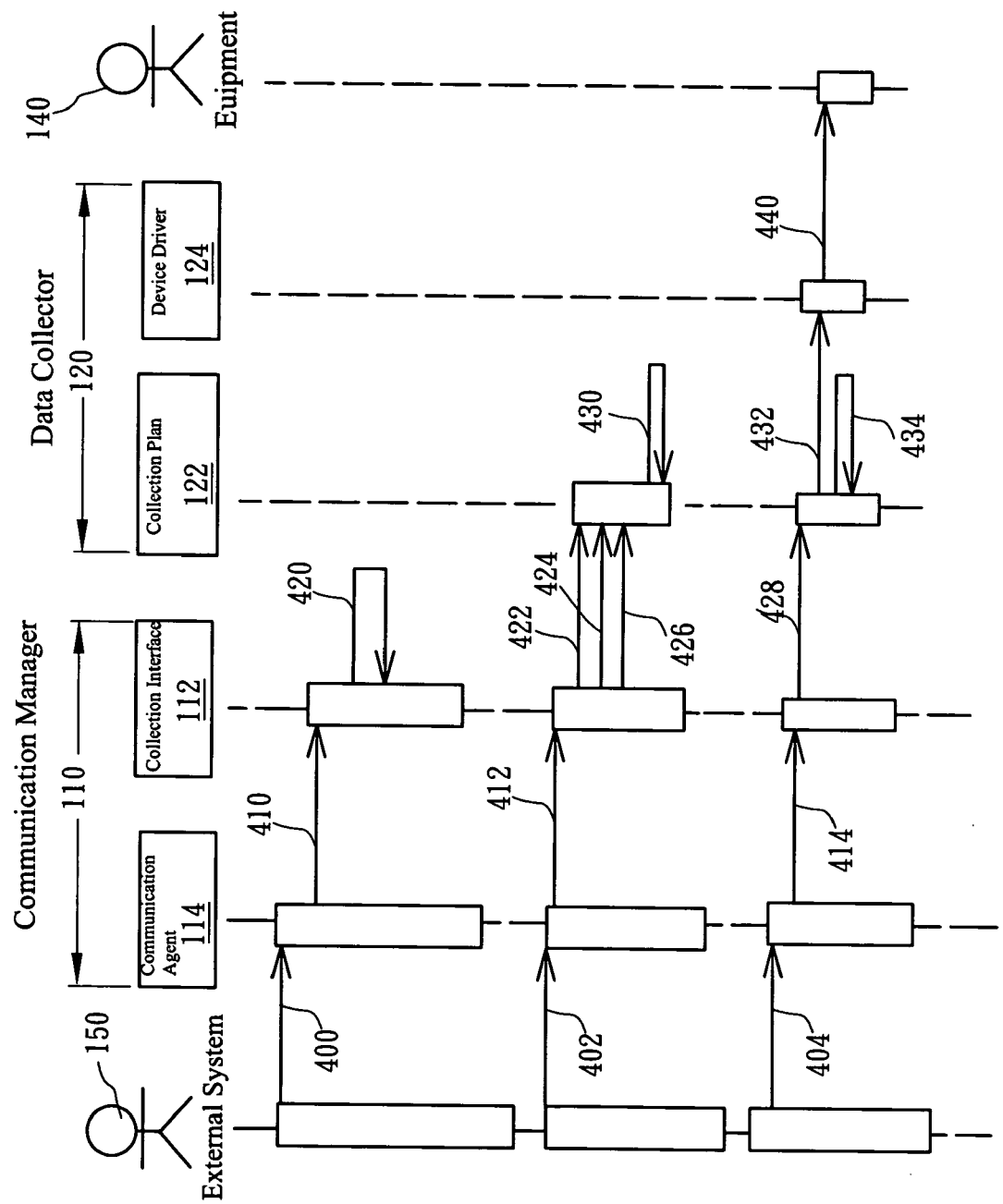
FIG. 4 is a schematic sequence diagram showing a data inquiry process of the present invention.

Referring to FIG. 4, FIG. 4 is a schematic sequence diagram showing a data inquiry process of the present invention. This process has three steps: checking security, generating data collection, and acquiring data. The data inquiry process is activated by a data-inquiry request sent by the external system 150. After the GED has received the information requested by the external system 150, the information is replied to the external system 150. Hereinafter, the detailed scenarios of those three steps will be discussed.

The external system 150 submits the data-inquiry request to the GED via wired or wireless network (step 400). After receiving the data-inquiry request, the communication agent 114 requests the collection interface 112 to process security checkup regarding the identity of the external system 150 (step 410). After completing the identity authentication (step 420), the communication agent 114 begins to receive the data related to the data-inquiry request sent from the external system 150 (step 402). Thereafter, the communication agent 114 sends the related data to the collection interface 112 (step 412), and then the collection interface 112 submits the data-inquiry request to the data collector 120. At first, the collection plan 122 sets data type (step 422), buffer size (step 424), and start time (step 426) in accordance with the related data sent by the communication manager 110, and then generates a data collection plan (step 430). After the data collection plan is generated, the external system 150 sends the data-inquiry request to the communication agent 114 (step 404), and then the communication agent 114 sends the data-inquiry request to the collection interface 112 (step 414). After receiving the data-inquiry request, the data collection plan is activated (step 428), and the collection interface 122 starts collecting data via the device driver 124 (step 432). Thereafter, the device driver 124 is linked to the physical interface of the equipment 140 so as to get the information of the equipment 140 (step 440). After obtaining the information of the equipment 140, the collection plan 122 classifies and filters the information (step 434), and sends the treated information back to the external system 150 via the communication manager 110.

To sum up, according to the present invention, the functional specification of the interface of each component in the GED can be summarized as follows, wherein the functions to be introduced in the following are the method calls used for performing the sequences shown in FIG. 2 to FIG. 4.

(1) the equipment 140: getData( );
(2) the external system 150: sendStatus( ); sendExceptionInfo( );
(3) the application interface 116 (a sub-module of the communication manager 110): receiveExceptionInfo( ); submitRequest( ); submitStatus( ); requstforData( );
(4) communication agent 114 (a sub-module of the communication manager 110): deliverRequestInfo( ); sendStatus( ); sendExceptionInfo( ); submitRequest( ); requstforData( );
(5) collection interface 112 (a sub-modules of the communication manager 110): sendExceptionInfo( ); deliverRequestInfo( ); requstforData( ); identify( ); authenticate( );
(6) collection plan 122 (a sub-module of the data collector 120): classifyException( ); setDataTyps( ); startDataCollectPlan( ); classify&fileterData( ); createDataCollectPlan( ); setBuffer( ); setStartTime( );

(7) device driver 124 (a sub-module of the data collector 120): deliverException( );startDataCollect( );

(8) IM application module 130: analyzeExceptionInfo( ); analyzeData( ).

The functional specifications described above are the fundamental functions required for all of the components that are linked with the object-oriented methods, and the methods therein can be called in various processes of information acquisition and transmission.

The GED of the present invention is applicable to a variety of fields, such as: embedded in a manufacturing equipment for executing status-monitoring, failure-detection and diagnosis, preventive maintenance, etc., on the equipment both locally and remotely; embedded in all kinds of application servers for enabling the servers or an external system to detect errors or performance degradation of the servers and to process error-recovery or fault-tolerant considerations, thereby improving the service quality and reliability of the application servers; embedded in an AGV (Automatic Guided Vehicle) for enabling the AGV itself or an external system to monitor the AGV's status, and detect and diagnose errors.

Hereinafter, a preferred embodiment is used for further explaining the present invention.

Figure 5:
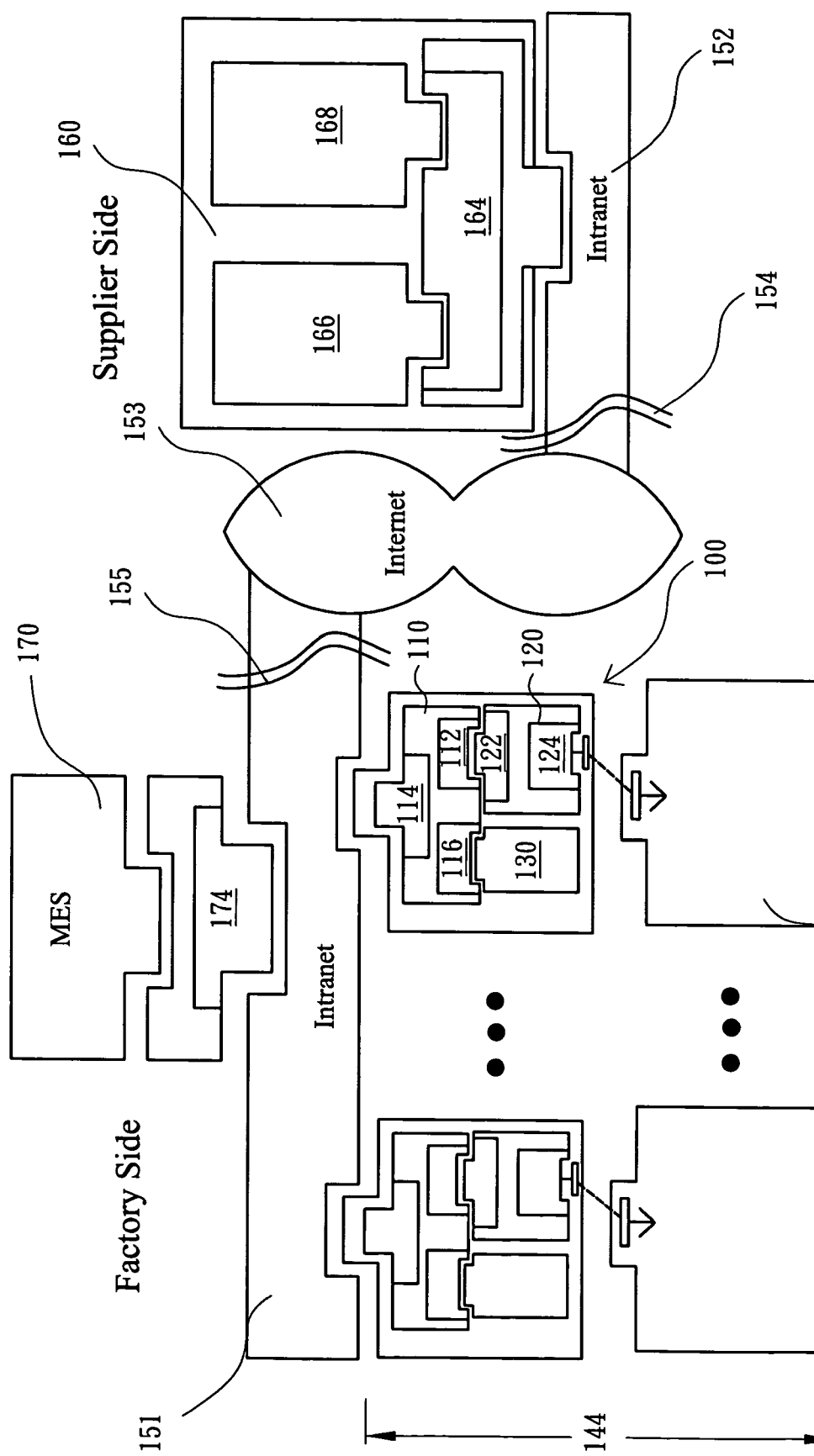
FIG. 5 is a schematic structural diagram showing an integrated architecture of applying the GED to e-diagnostics and e-maintenance of semiconductor manufacturing equipment, according to an embodiment of the present invention.

Referring to FIG. 5, FIG. 5 is a schematic structural diagram showing an integrated architecture of applying the GED 100 to e-diagnostics and e-maintenance of semiconductor manufacturing equipment, according to an embodiment of the present invention, wherein a plurality of GEDs are installed in respective equipments 140 (such as manufacturing machines) which adopt the interface specification of CEM (Common Equipment Model) defined by SEMI organization, and each GED therein is used for retrieve the information of each equipment 140. The information of the equipment 140 is provided for use in a MES (Manufacturing Execution System) 170 located at a factory side of an Intranet 151; and in a remote diagnostics/Maintenance server 160 located at a supplier side of an Intranet 152, wherein the Intranet 151 and the Intranet 152 are linked to an Internet 153, and are guarded by using firewalls 154 and 156.

The IM application module 130 is an application program for diagnosing/maintaining the equipment 140. A remote diagnostics/maintenance server (RDMS) 160 can retrieve the information of the equipment 140 via the Internet 153, wherein the GED 100 supports wired/wireless communications. Hence, the external system (such as the MES 170 or the RDMS 160) can get the information from the GED via a wired or wireless network. Since a unified communication protocol (such as SOAP) is used among the MES 170, the RDMS 160 and the GED 100 installed in the equipment 140, those three members can adopt the communication agents 114, 174 and 164 of the same specification to communicate with one another via the Intranet 151, the Intranet 152 and the Internet 153. Further, the diagnostics/maintenance application module (i.e. the IM application module 130) can be embedded in the GED 100, and the GED 100 is installed in the equipment 140 having the CEM interface, thus forming a CEM equipment 144 equipped with a GED.

A device driver 124 is a special module of CEM interface specification for accessing the data of the equipment 140 having the CEM interface. When the interface specification of the equipment 140 to be linked is changed, only the device driver 124 has to be replaced and all the other modules in the GED 100 do not need to be redesigned or replaced, thus providing the GED 100 with high migration capability among various kinds of information equipment.

When an error or exception message occurs to the equipment 140 (semiconductor machine), the equipment 140 submits the exception message to the IM application module 130 via the data collector 120 and the communication manager 110 for diagnostics/maintenance analysis, according to the exception notification process as shown in FIG. 2. Thereafter, the IM application module 130 sends the analyzed status report to the MES 170 (the external system) via the communication agents 114 and 174.

Further, in order to achieve the purpose of periodic inspection and preventive maintenance, the equipment 140 may adopt the periodic inspection process as shown in FIG. 3, wherein periodic inspection periods are scheduled by the IM application module used for diagnostics/maintenance, and the data-inquiry requests are actively submitted periodically. The IM application modules 130 first sends the data related to the data-inquiry request to the collection plan 122 of the data collector 120 via the communication manager 110 so as to set data type, buffer size and start time, and thus a data collection plan is established. After the data collection plan is built, the IM application module 130 starts to retrieve the related information from the equipment 140 via the communication manager 110 and the data collector 120. After completing the collection of the information, the IM application module 130 begins to perform a preventive maintenance analysis. After the analysis is done, the IM application module 130 generates a status report, and sends the status report to the MES 170 located at the factory side via the communication agents 114 and 174.

When the IM application module 130 or the factory side fails to resolve some of the diagnostics/maintenance problems, the factory side will ask the supplier for assistance. At this time, the supplier can follow the data inquiry process as shown in FIG. 4 to submit a data-inquiry request to the unhealthy equipment 140 located at the factory side from the RDMS 160 (external system) of the supplier side. Meanwhile, since the RDMS 160 is located outside the factory and it needs to rely on the Internet 153 to submit the data-inquiry request, for the security considerations, a series of checkups (such as identity verification, etc.) have to be performed by the collection interface 112 located in the communication manager 110. After authentication, the RDMS 160 then is allowed to perform the process of submitting the data-inquiry request. After receiving the data related to the data-inquiry request sent from the RDM 160, the communication manager 110 transfers the request-related data to the collection plan 122 of the data collector 120 for generating the data collection plan. Subsequently, the RDMS 160 can get the related information from the equipment 140 via the communication manager 110 and the data collector 120. After completing the data collection, the RDMS 160 can perform analysis in a diagnostic module 166 or a maintenance module 168. Accordingly, the process described above is the so-called e-diagnostics and e-maintenance data-inquiry process.

From the aforementioned embodiment of the present invention, it can be known that the GED and the mechanism thereof for various IM applications have the advantages of: (1) adopting two-tiered structure including a device driver and a collection plan, wherein the device driver is equipment-dependent, and the collection plan is equipment-independent, so that only the corresponding device driver needs replacing while the information equipment to be linked is changed, thus having high migration capability among different kinds of information equipment; (2) enabling one unified standard collection plan module to be applicable to different device drivers; (3) using the object-oriented technology to fabricate the device driver and the collection plan, wherein those two modules use method calls for transmitting data and have a unified standard interface specification; (4) enabling the device driver to adopt a wireless communication protocol (such as Bluetooth, etc.) for linking to the information equipment having wireless communication capability.

Another advantage of the present invention is to provide a GED and a mechanism thereof for various IM applications, wherein the interface of the IM application module can be easily extended and added.

Another advantage of the present invention is to provide the GED and the mechanism thereof for various IM applications, wherein three standardized information acquisition and transmission processes are established for generic use in retrieving and transmitting information of various kinds of information equipment for the intelligent maintenance purposes.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A generic embedded device (GED) for various intelligent-maintenance (IM) applications, wherein said GED is used for retrieving, collecting, managing and analyzing information of equipment, said GED comprising:
    a data collector used solely for collecting and managing said information from said equipment, said data collector further comprising:
        a device driver used solely for getting said information of said equipment, wherein said device driver is dependent on said equipment; and
        a collection plan responsible solely for managing said information obtained by said device driver, wherein said collection plan is independent of said equipment; and
    a communication manager used for establishing communication channels among said data collector, a pluggable IM application module and. at least one external system, wherein said pluggable IM application module is used solely for providing said various IM applications for said equipment said communication manager comprising:
        a communication agent used for sending said information to said external system, and for allowing said external system to send a command;
        a collection interface used for linking to said collection plan so as to transmit said information to said pluggable IM application module and said external system; and
        an application interface responsible for linking to said pluggable IM application module, wherein said pluggable IM application module uses said application interface to get said information sent by said data collector, and said pluggable IM application module is plugged in said GED via said application interface.

2. The GED of claim 1, wherein said pluggable IM application module is a customized application module that can be plugged into said GED.

3. The GED of claim 1, wherein said pluggable IM application module is installed inside said GED.

4. The GED of claim 1, wherein said GED is installed inside said equipment.

5. The GED of claim 1, wherein said information is sent to said external system via said communication agent with wired or wireless network.

6. The GED of claim 5, wherein said network is selected from the group consisting of an Internet, an Intranet and a hybrid structure thereof.

7. The GED of claim 1, wherein the communication specification adopted by said communication agent is selected from the group consisting of SOAP (Simple Object Access Protocol), CORBA (Common Object Request Broker Architecture), DCOM (Distributed Component Object Model), and RMI (Remote Method Invocation).

8. The GED of claim 1, wherein the scheme of said device driver for obtaining said information is to use one of a standard hardware I/O interface, a standard TCP/IP-wired or wireless network protocol, an interface provided by hardware, a file transfer and an industry-defined specification.

9. The GED of claim 1, wherein said GED is built in a bi-directional communication infrastructure.

10. The GED of claim 1, wherein the standard functional specification of said application interface is a class module composed of a function of receiving exception information, a function of submitting a request, a function of submitting a status report, and a function of requesting for said information.

11. The GED of claim 1, wherein the standard functional specification of said pluggable IM application module is a class module composed of a function of analyzing exception information, and a function of analyzing said information.

12. A mechanism of a generic embedded device (GED) for various intelligent-maintenance (IM) applications, wherein said GED is used for retrieving, collecting, managing and analyzing information of equipment, said GED comprising: a device driver used solely for getting said information of said equipment, wherein said device driver is dependent on said equipment: and a collection plan responsible solely for managing said information obtained by said device driver, wherein said collection plan is independent of said equipment; said mechanism comprising:
    an exception notification, wherein said equipment initiates an exception message actively, and said exception message is classified by said collection plan and delivered to an pluggable IM application module or an external system via said GED:
    a periodic inspection process activated by a data-retrieval request periodically sent out by said pluggable IM application module, wherein, said collection plan first generating a first data collection plan, after said collection plan has retrieved said information in accordance with said data-retrieval request and said first collection plan via said device driver, said information is sent to said pluggable IM application module, and after said pluggable IM application module has analyzed said information and generate an analysis result, said analysis result is sent to said external system; and
    a data inquiry process activated by a data-inquiry request sent by said external system, wherein, said GED first processes the security checkup of said external system, and then said collection plan generates a second data collection plan, and then said collection plan retrieves said information in accordance with said data-inquiry request and said second data collection plan via said device driver, and thereafter said information is replied to said external system via a communication agent of said GED.

13. The mechanism of claim 12, wherein said pluggable IM application module is a customized application module externally added to said GED.

14. The mechanism of claim 12, wherein said pluggable IM application module is installed inside said GED.

15. The mechanism of claim 12, wherein said GED is installed inside said equipment.

16. The mechanism of claim 12, wherein said information Is sent to said external system via said communication agent with a wired or wireless network.

17. The mechanism of claim 16, wherein said network is selected from the group consisting of an Internet, an Intranet and a hybrid structure thereof.

18. The GED of claim 12, wherein the communication specification adopted by said communication agent is selected from the group consisting of SOAP, CORBA, DCOM, and RMI.

19. The GED of claim 12, wherein the scheme of said device driver for obtaining said information is to use one of a standard hardware I/O interface, a standard TCP/IP-wired or wireless network protocol, an interface provided by hardware, a file transfer and an industry-defined specification.

20. The mechanism of claim 12, wherein said GED is built in a bi-directional communication infrastructure.

* * * * *